(12) United States Patent
Fischer (10) Patent No.: US 7,911,969 B2
(45) Date of Patent: Mar. 22, 2011

(54) WIRELESS COMMUNICATION METHOD FOR TRANSMITTING A SEQUENCE OF DATA UNITS BETWEEN A WIRELESS DEVICE AND A NETWORK

(75) Inventor: Patrick Fischer, Paris (FR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 12/195,253

(22) Filed: Aug. 20, 2008

(65) Prior Publication Data

US 2009/0196252 A1 Aug. 6, 2009

Related U.S. Application Data

(60) Provisional application No. 61/026,117, filed on Feb. 4, 2008.

(51) Int. Cl.
*G06F 11/00* (2006.01)
(52) U.S. Cl. ........................................................ 370/252
(58) Field of Classification Search .................. 370/252, 370/389
See application file for complete search history.

(56) References Cited

U.S. PATENT DOCUMENTS

| | | | |
|---|---|---|---|
| 6,163,861 A | 12/2000 | Yoshioka | |
| 6,594,486 B1 | 7/2003 | Rasanen | |
| 6,697,331 B1 | 2/2004 | Riihinen et al. | |
| 6,801,512 B1 | 10/2004 | Cudak et al. | |
| 7,184,426 B2 | 2/2007 | Padovani et al. | |
| 2004/0248575 A1 | 12/2004 | Rajala et al. | |
| 2006/0034277 A1 * | 2/2006 | Jang et al. | 370/389 |
| 2007/0277074 A1 | 11/2007 | Yeo et al. | |
| 2008/0294958 A1 * | 11/2008 | Lee et al. | 714/748 |

FOREIGN PATENT DOCUMENTS

| | | |
|---|---|---|
| WO | 2007/078142 | 7/2007 |
| WO | 2007/127950 | 11/2007 |

OTHER PUBLICATIONS

3rd Generation Partnership Project (3GPP), "Technical Specification Group Radio Access Network; Evolved Universal Terrestrial Radio Access (E-UTRA); Packet Data Convergence Protocol (PDCP) Specification (Release 9)," Technical Specification 3GPP TS 36.323, V9.0.0, Dec. 2009.

* cited by examiner

*Primary Examiner* — Albert T Chou
(74) *Attorney, Agent, or Firm* — Lee, Hong, Degerman, Kang & Waimey (57) ABSTRACT

Wireless communication method for transmitting a status report for a sequence of data transmitted along a wireless communication link between a wireless device and a network having a plurality of base stations, the wireless communication link having a transmitting side and a receiving side. The method comprises: on the receiving side, determining status information on data units of the sequence, indicating whether each data unit has been received or not on the receiving side; and transmitting, from the receiving side to the transmitting side of the wireless communication link, a status report containing a pointer designating a first non-received data unit in the sequence and a bitmap providing the status information for a set of data units following said first non-received data unit in the sequence.

20 Claims, 8 Drawing Sheets

WIRELESS COMMUNICATION METHOD FOR TRANSMITTING A SEQUENCE OF DATA UNITS BETWEEN A WIRELESS DEVICE AND A NETWORK

This application claims priority of U.S. Provisional Application No. 61/026,117 filed on Feb. 4, 2008, the content of which is incorporated herein by reference

BACKGROUND OF THE INVENTION

1. Field of the Invention

The present invention relates to wireless communication. It more particularly relates to selective retransmission of data units between a wireless device and a network, depending on whether they have been received or not.

While it is described below in the context of an LTE (Long Term Evolution) type of cellular network for illustration purposes and because it happens to be well suited to that context, those skilled in the communication art will recognize that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS, also known as evolved universal mobile telecommunication system (E-UMTS), is under discussion by the 3rd generation partnership project (3GPP) that standardized UMTS.

LTE is a technology for enabling high-speed packet communications. Many schemes have been proposed for the LTE objective including those that aim to reduce user and provider costs, improve service quality, and expand and improve coverage and system capacity. LTE requires reduced cost per bit, increased service availability, flexible use of a frequency band, a simple structure, an open interface, and adequate power consumption of a terminal as an upper-level requirement.

Figure 1:
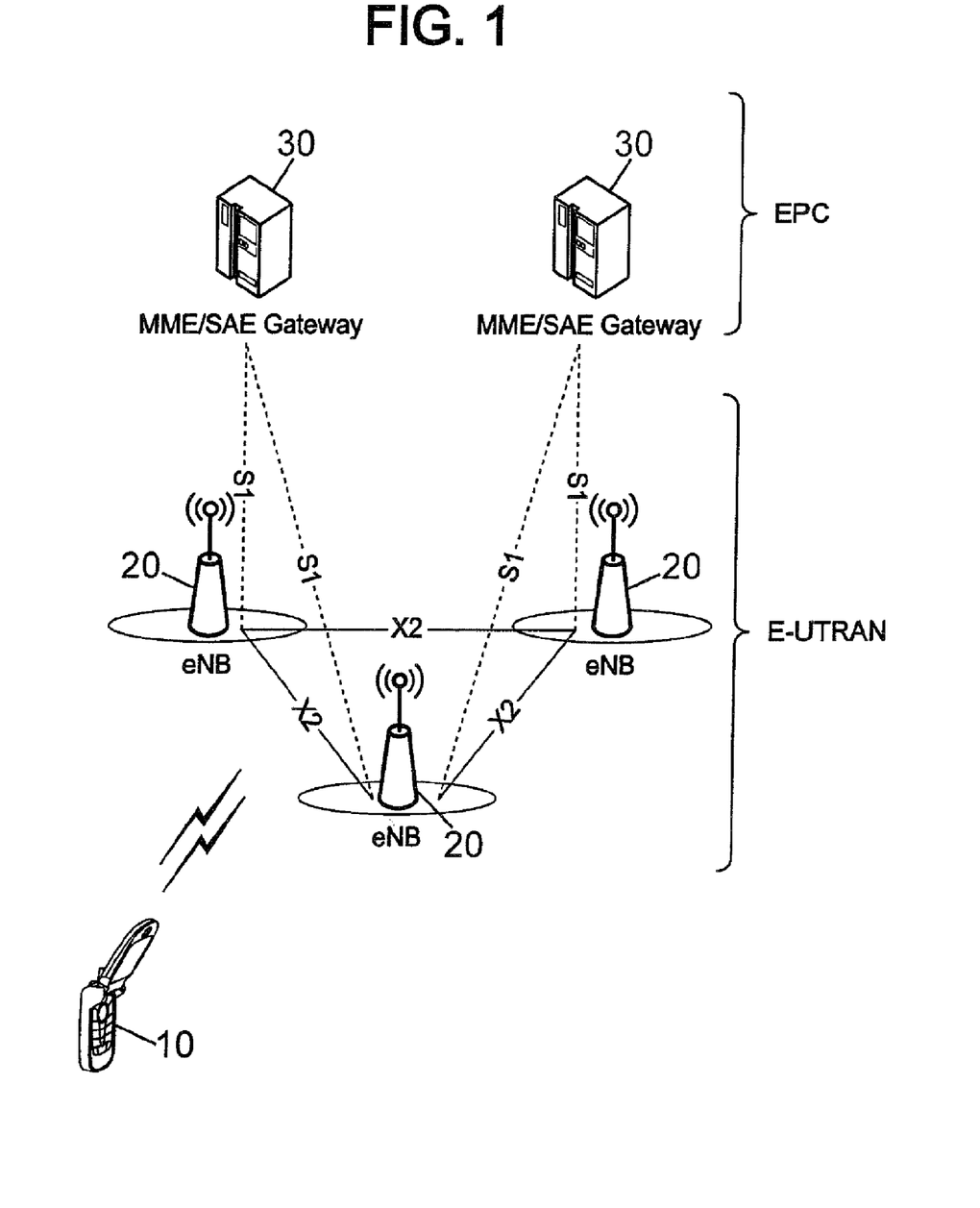
FIG. 1, already discussed, is a block diagram illustrating network structure of an E-UMTS (or LTE) system.

FIG. 1 is a block diagram illustrating network structure of an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2A:
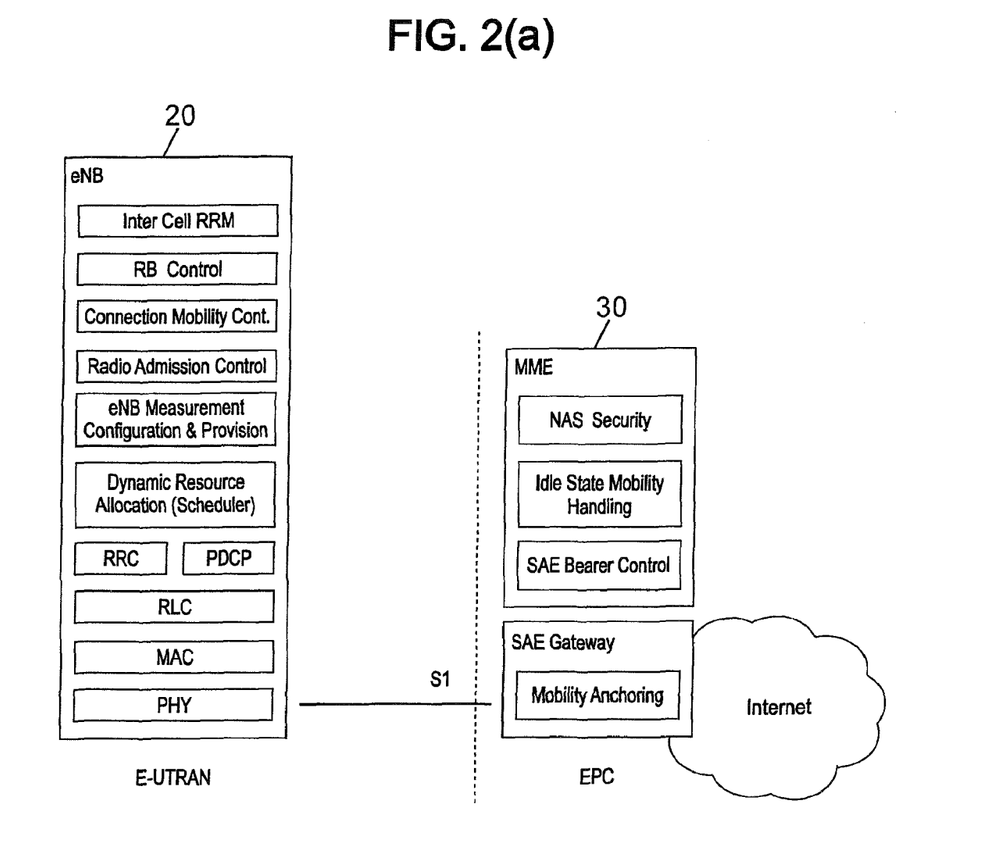
FIGS. 2(a), 2(b) and 2(c), already discussed, are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 2(a) is a block diagram depicting the architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 2B:
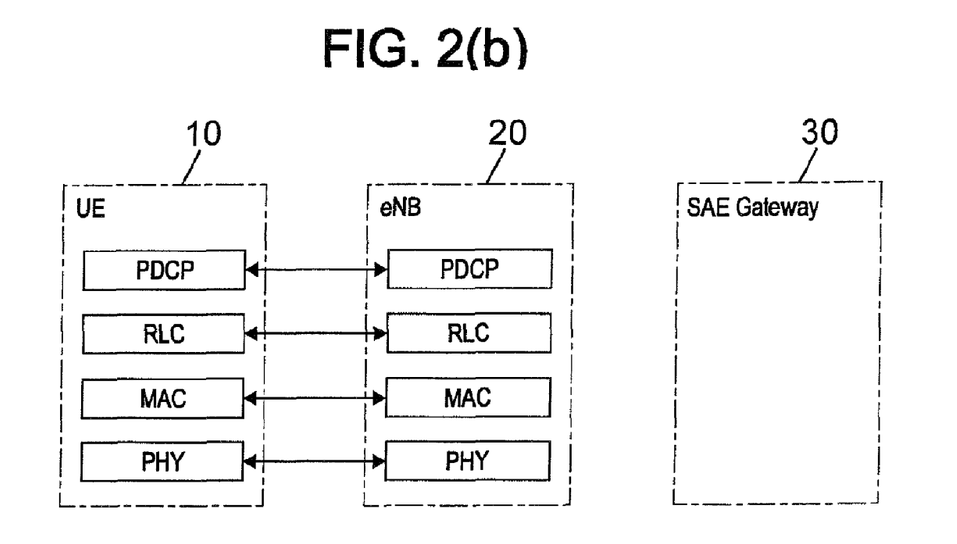
Figure 2C:
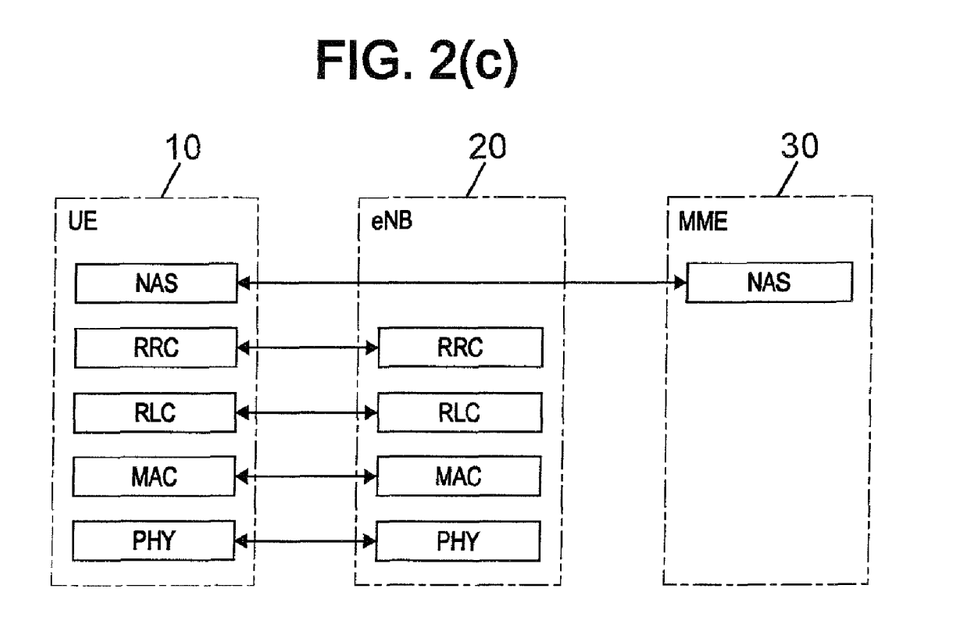

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth. The PDCP layer receives SDUs (Service Data Units) as an input and delivers compressed PDUs (Packet Data Units) as an output to lower layers.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

As illustrated in FIG. 2(c), the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

A wireless communication link is a link between a wireless device (e.g. a UE in the context of LTE) and a network having a plurality of base stations (e.g. eNodeBs in the context of LTE). As it is directional, such a wireless communication link has a data unit transmitting side and a data unit receiving side. Depending on the direction of the link, the wireless device may be on the data unit transmitting side while the network is on the data unit receiving side, or the wireless device may be on the data unit receiving side while the network is on the data unit transmitting side.

Under some circumstances, a handover of such a wireless communication link with a wireless device may be initiated from a source base station to a target base station.

It is reminded that the handover procedure is made to transfer, or hand off, a pending communication from a source cell, serviced by a source eNodeB, to a target cell, serviced by a target eNodeB. We consider here the non limiting case where the source and target cells are not serviced by the same eNodeB.

Figure 3:
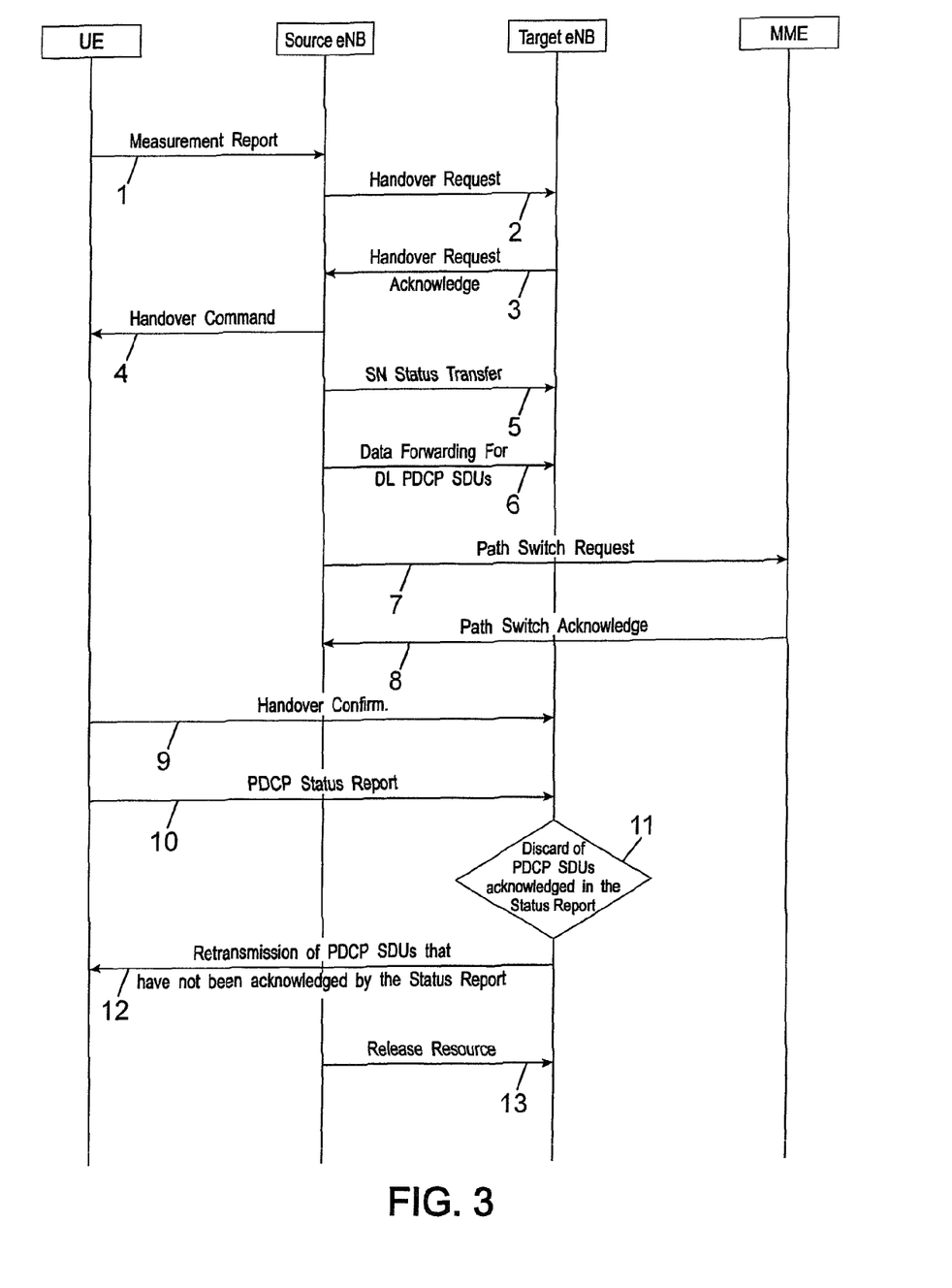
FIG. 3, already discussed, is a diagram illustrating a typical handover procedure in an LTE system in relation to a communication including the transmission in sequence of data units from the source eNodeB to the UE.

FIG. 3 schematically shows transmissions in relation to a wireless communication link in which the wireless device is on the data unit receiving side and the network is on the data unit transmitting side of the wireless communication link, a handover of the wireless communication link with the UE being initiated from a source eNodeB to a target eNodeB.

Further detail on the transmitted messages can be found in the relevant LTE technical specifications, in particular in the 3GPP TS 36.423 V8.0.0 "3rd Generation Partnership Project; Technical Specification Group Radio Access Network; Evolved Universal Terrestrial Radio Access Network (EU-TRAN); X2 application protocol (X2AP) (Release 8)" and in the 3GPP TS 36.300 V8.3.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", both released in December 2007.

Before the handover procedure starts, a sequence of (downlink) data units is transmitted along the wireless communication link from the source eNodeB to the UE.

The data units considered here are data units of the PDCP (Protocol Data Convergence Protocol) layer, also called PDCP SDUs (Service Data Units). PDCP in the context of LTE is fully described in the technical specification 3GPP TS 36.323 V8.0.0 "3rd Generation Partnership Project; Technical Specification Group Radio Access Network; Evolved Universal Terrestrial Radio Access (E-UTRA); Packet Data Convergence Protocol (PDCP) specification (Release 8)", released in December 2007.

Other types of data units may however be considered as well, as will appear to one skilled in the art. In particular, data units of a layer different from PDCP could be considered.

The source eNodeB configures the UE measurement procedures, which form part of the RRC protocol depicted in FIG. 2(a), according to area restriction information provisioned in each eNodeB. This may be done by sending one or more MEASUREMENT CONTROL messages to the UE in the RRC_CONNECTED state. Measurements requested by the source eNodeB may assist the function controlling the UE's connection mobility. The UE is then triggered to send MEASUREMENT REPORT messages (reference 1) according to rules set by e.g. system information broadcast by the source eNodeB and/or specified in the MEASUREMENT CONTROL message or additional downlink signaling.

For each UE in the RRC_CONNECTED state, the source eNodeB runs one or more handover control algorithms whose inputs include the measurements reported by the UE and possibly other measurements made by the source eNodeB. Depending on the measurements, the source eNodeB may decide to hand off the UE to a target eNodeB. When this occurs, the source eNodeB issues a HANDOVER REQUEST message to the target eNodeB (reference 2), passing necessary information to prepare the handover on the target side. Such information includes a UE X2 signaling context reference at the source eNodeB, a UE S1 EPC signaling context reference, a target cell identifier, an RRC context and a SAE bearer context. The UE X2 and UE S1 signaling context references enable the target eNodeB to address the source eNodeB and the EPC. The SAE bearer context includes necessary radio network layer (RNL) and transport network layer (TNL) addressing information.

An admission control function may be performed by the target eNodeB depending on the received SAE bearer quality of service (QoS) information to increase the likelihood of a successful handover, if the necessary resources are available at the target eNodeB. If the handover is admitted, the target eNodeB configures the resources according to the received SAE bearer QoS information and reserves a new cell-radio network temporary identifier (C-RNTI) for the sake of identifying the UE in the target cell. The target eNodeB prepares the handover in layers 1 and 2 and sends a HANDOVER REQUEST ACKNOWLEDGE message to the source eNodeB (reference 3). The HANDOVER REQUEST ACKNOWLEDGE message includes a transparent container to be passed to the UE 10. The container may include the new C-RNTI allocated by the target eNodeB, and possibly some other parameters such as access parameters, system information blocks (SIBs), etc. The HANDOVER REQUEST ACKNOWLEDGE message may also include RNL/TNL information for the forwarding tunnels, if necessary.

In response, the source eNodeB generates the HANDOVER COMMAND message of the RRC protocol and sends it towards the UE (reference 4). In parallel, the source eNodeB transfers to the target eNodeB part or all of the date units that are buffered for transmission to the UE and currently in transit towards the UE, as well as information relating to acknowledgement status of the data units by the UE.

The HANDOVER COMMAND message includes the transparent container, which has been received from the target eNodeB. The source eNodeB applies the necessary functions of integrity protection and ciphering to the message. The UE receives the HANDOVER COMMAND message with the necessary parameters (new C-RNTI, possible starting time, target eNodeB SIBs etc.) and is thereby instructed by the source eNodeB to perform the handover. The UE complies with the handover command by detaching from the source cell, getting synchronization and accessing the target cell.

When the UE has successfully accessed the target cell, it sends a HANDOVER CONFIRM message to the target eNodeB using the newly allocated C-RNTI (reference 9) to indicate that the handover procedure is completed on the UE side. The target eNodeB verifies the C-RNTI sent in the HANDOVER CONFIRM message. If the verification is positive, the EPC is informed by the HANDOVER COMPLETE message from the target eNodeB that the UE has changed cell. The EPC switches the downlink data path to the target side and it releases any U-plane/TNL resources towards the source eNodeB. The EPC confirms by returning a HANDOVER COMPLETE ACK message.

The target eNodeB then informs the source eNodeB that the handover was successful by sending a RELEASE RESOURCE message (reference 13), which triggers the release of resources, i.e. radio and C-plane related resources associated to the UE context, by the source eNodeB.

As shown in FIG. 3, after the handover from the source eNodeB to the target eNodeB was initiated (references 1-4), the source eNodeB forwards to the target eNodeB downlink PDCP SDUs for which reception in the UE has not been acknowledged to the source eNodeB (reference 6), such that the target eNodeB can retransmit them to the UE.

A PDCP status report is configured at the UE, which transfers it to a lower layer. A transmission unit in the UE may further transmit the PDCP status report (reference 10) to the target eNodeB. It is indicated by RRC signalling whether this PDCP status report shall be sent or not. The format and content of the PDCP status report appear in section 6.2.6 of the above mentioned TS 36.323 and is reproduced in FIG. 5.

Figure 5:
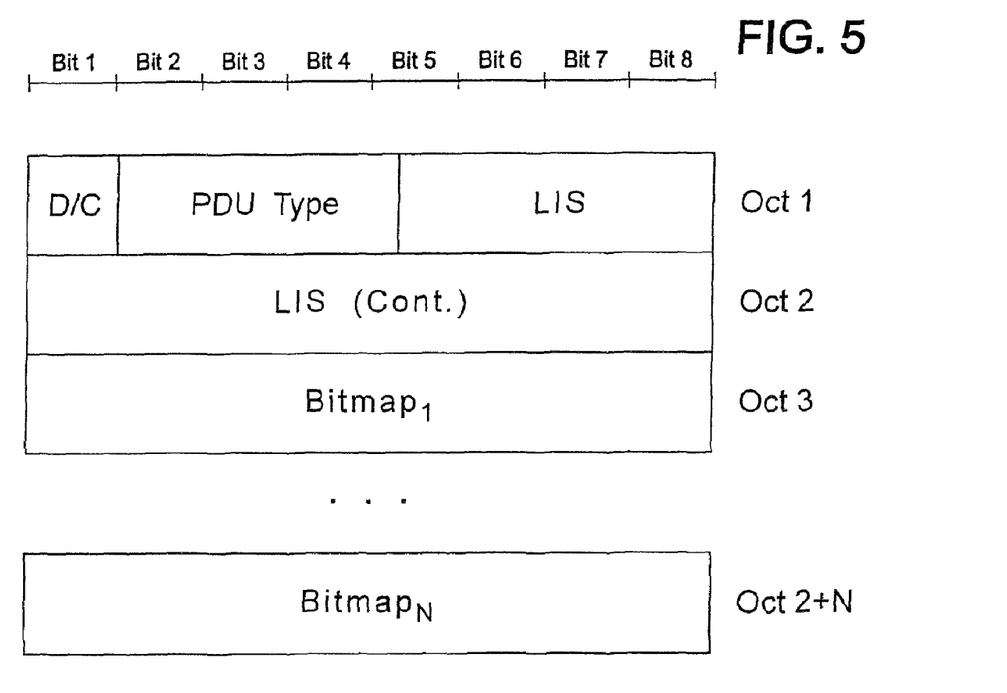
FIG. 5, already discussed, shows the format of a PDCP status report sent from the UE to the target eNodeB during a handover procedure.

As shown in FIG. 5, the PDCP status report contains a 12 bits LIS field including the last in sequence received PDCP sequence number, that is the sequence number of the last PDCP SDU received in sequence by the UE.

"In sequence received PDCP SDUs" can be defined as received PDCP SDUs of the transmitted sequence of PDCP SDUs preceding the first non received PDCP SDU in the sequence. So, the LIS field is a pointer designating the PDCP SDU of the sequence preceding immediately the first non received PDCP SDU.

The PDCP status report also contains a bitmap providing status information on PDCP SDUs of the sequence, which may be stored in a storage unit of the UE and indicating, for each PDCP SDU having a sequence number (SN) higher than LIS (i.e. for each PDCP SDU of the sequence following the last in sequence received PDCP SDU), whether said PDCP SDU has been received or not by the UE.

More specifically, this bitmap has a variable size and is built such that the MSB (Most Significant Bit) of its first octet (Oct 3 in FIG. 5) indicates whether or not the PDCP PDU with the SN (LIS+1) modulo 4096 has been received and, optionally whether or not the corresponding PDCP PDU (Protocol Data Unit) has been decompressed correctly, while the LSB (Least Significant Bit) of the first octet (Oct 3 in FIG. 5) indicates whether or not the PDCP PDU with the SN (LIS+8) modulo 4096 has been received correctly. The same applies as far as the $N^{th}$ octet of the bitmap (Oct 2+N in FIG. 5), such that the bitmap can cover every PDCP SDU from the PDCP SDU following immediately the last in sequence received PDCP SDU to the last received PDCP SDU.

Each bit of the bitmap is set to:
  0 when the PDCP PDU with PDCP Sequence Number= (LIS+bit position) modulo 4096 has not been received or optionally has been received but has not been decompressed correctly; or
  1 when the PDCP PDU with PDCP Sequence Number= (LIS+bit position) modulo 4096 has been received correctly and may or may not have been decompressed correctly.

In other words, all positions in the bitmap corresponding to PDCP SDUs that have not been received as indicated by RLC and optionally, PDCP PDUs for which decompression has failed are set to 0, while all other positions in the bitmap are set to 1.

When the source eNodeB receives the PDCP status report, it can discard all PDCP SDUs that are indicated with the binary value 1 in the bitmap, as well as PDCP SDUs with a PDCP SN equal or lower than the PDCP SN indicated by the LIS field (reference 11 in FIG. 3).

The other PDCP SDUs, i.e. those indicated with the binary value 0 in the bitmap, can be retransmitted to the UE by the target eNodeB that has received them previously from the source eNodeB (reference 12).

In this way, in case the source eNodeB has not received up to date RLC status information from the UE prior to the handover, unnecessary retransmission by the target eNodeB of PDCP SDUs already received by the UE is prevented.

Figure 4:
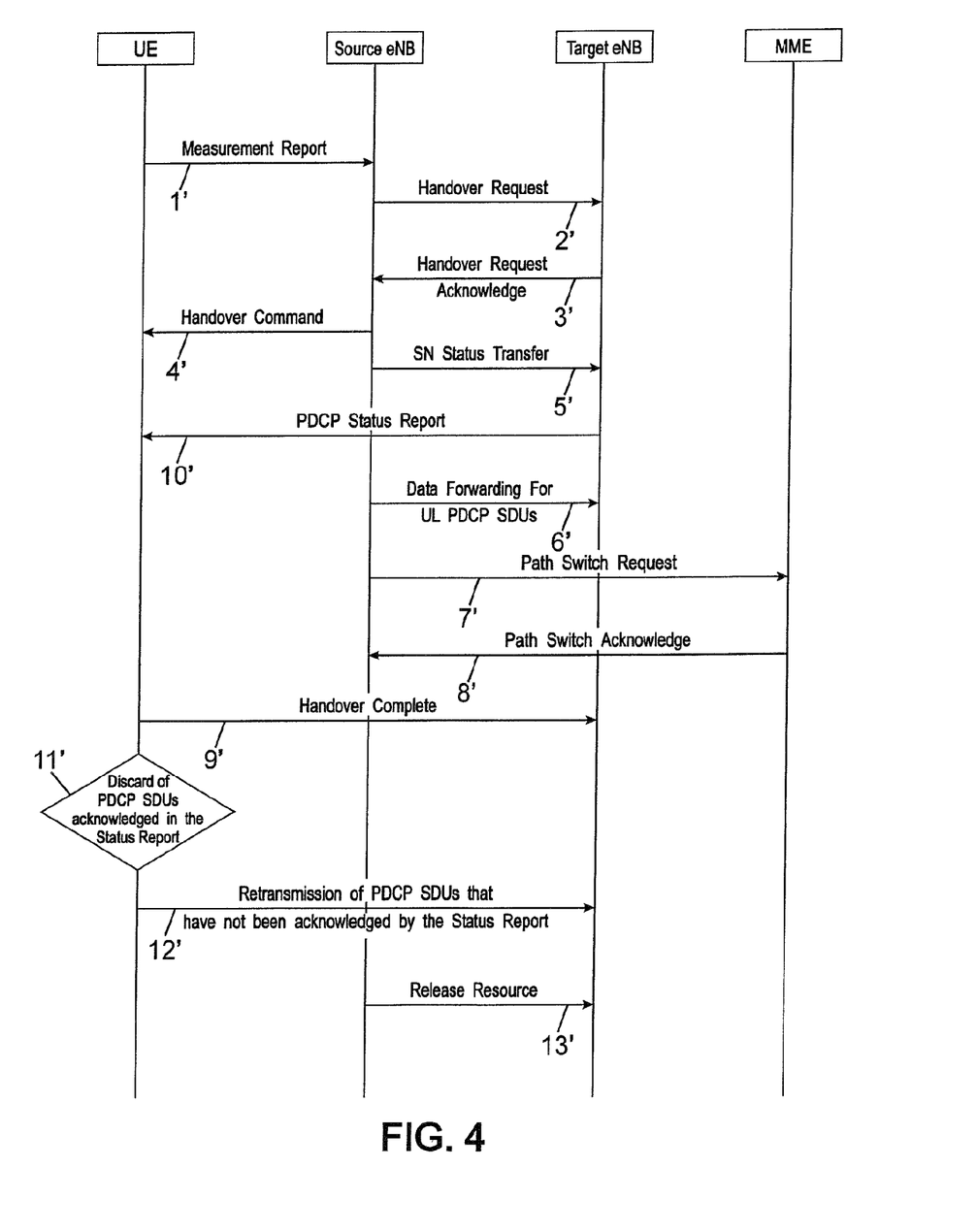
FIG. 4, already discussed, is a diagram illustrating a typical handover procedure in an LTE system in relation to a communication including the transmission in sequence of data units from the UE to the source eNodeB.

FIG. 4 schematically shows transmissions in relation to a wireless communication link in which the wireless device is on the data unit transmitting side and the network is on the data unit receiving side of the wireless communication link, a handover of the wireless communication link with the UE being initiated from a source eNodeB to a target eNodeB.

So, before the handover procedure starts, a sequence of (uplink) data units is transmitted along the wireless communication link from the UE to the source eNodeB.

Most of the transmissions shown in FIG. 4 are identical or similar to the ones in FIG. 3.

The SN status transfer message (reference 5') sent by the source eNodeB to the target eNodeB includes an indication of the last in sequence received PDCP sequence number as well as of whether or not the following uplink PDCP SDUs have been correctly received at the source eNodeB in the form of a bitmap.

Based on the information contained in the SN status transfer message, the target eNodeB may then build and transmit to the UE a PDCP status report (reference 10'), which like in the case illustrated in FIG. 3, may include a LIS field identifying the last in sequence received PDCP sequence number and a bitmap indicating whether the PDCP SDUs having sequence numbers (SNs) higher than LIS have been received or not by the source eNodeB.

When the UE receives the PDCP status report, it can discard all PDCP SDUs that are indicated with the binary value 1 in the bitmap, as well as PDCP SDUs with a PDCP SN equal or lower than the PDCP SN indicated by the LIS field (reference 11' in FIG. 4).

The other PDCP SDUs, i.e. those indicated with the binary value 0 in the bitmap, can be retransmitted to the target eNodeB by the UE (reference 12').

Of course, two wireless communication links having opposite directions may exist simultaneously between a UE and the network, one for transmitting downlink PDCP SDUs and the other for transmitting uplink PDCP SDUs. In this case, the above described mechanisms as illustrated in FIGS. 3 and 4 may both be carried out in parallel and selective retransmission may occur in both directions.

The LIS field of the status report, in the uplink or downlink direction, as explained above, contains the sequence number SN of the "Last in-sequence" received PDCP SDU. This implies that at least one PDCP SDU has been received in sequence.

However in the case that the first transmitted PDCP SDU, i.e. the PDCP SDU having the sequence number 0, has not been received, but other PDCP SDUs have been received, there is no in sequence received PDCP SDU. In other words, there is no PDCP SDU received before the first non received PDCP SDU.

Figure 6:
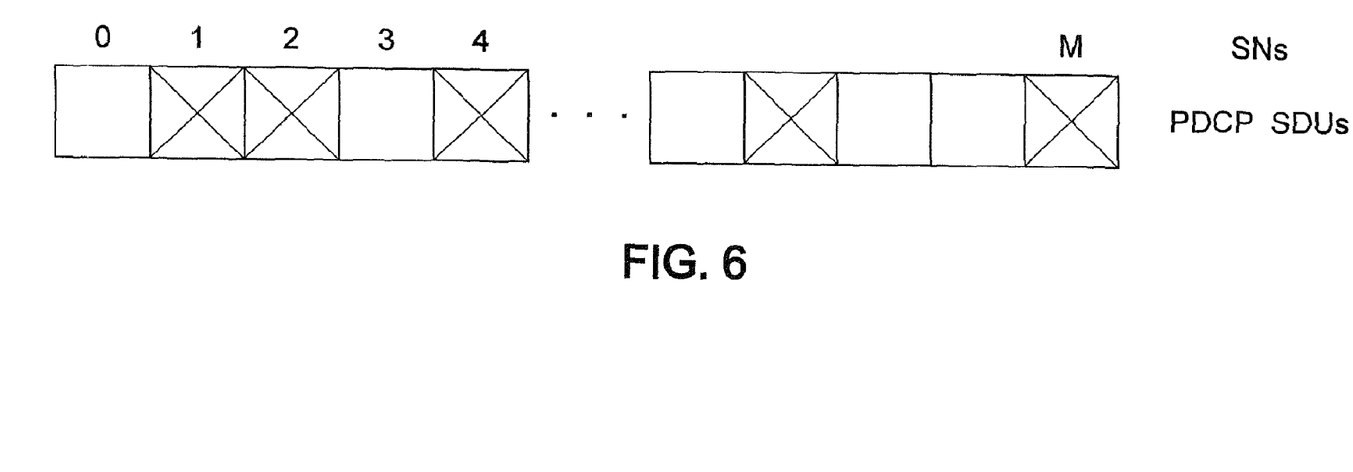
FIG. 6 schematically shows a reception status where no last in sequence received PDCP SDU can be identified.

Such situation is illustrated in FIG. 6, where crossed boxes represent received PDCP SDUs, while empty boxes represent non-received PDCP SDUs (or possibly non correctly decompressed PDCP PDUs). As shown in FIG. 6, the PDCP SDU with the SN 0 has not been received on the data unit receiving side (by the source eNode B or the UE). So the first transmitted PDCP SDU is also the first non received PDCP SDU. However other PDCP SDUs, such as the ones having SNs 1, 2, 4 and M have been received. In this case, there is no in sequence received PDCP SDU.

As no LIS value can be determined in this case, the UE and the target eNodeB will not be able to fill in a status report, and it will not be possible to indicate what PDCP SDUs have been received and what PDCP SDUs have not. In the absence of such information, this may result in extensive retransmission or, on the contrary, to a drop of any retransmission, which would both have detrimental effects (bandwidth occupation or significant loss of useful information in the communication).

In fact the value −1 would have to be indicated in the LIS field of the status report so that the bitmap can start with the PDCP SDU with SN 0. But this is not possible as there are a limited number of values available for the LIS field (4096 values for the 12 bits format in LTE) which are all used already. Adding the value −1 would thus require extending the size of the LIS field, e.g. with at least one additional bit, which would not comply with the existing specifications.

An object of the present invention is to overcome this disadvantage.

SUMMARY OF THE INVENTION

The invention proposes a wireless communication method for transmitting a status report for a sequence of data transmitted along a wireless communication link between a wireless device and a network having a plurality of base stations, the wireless communication link having a data unit transmitting side and a data unit receiving side.

The method comprises:
  on the data unit receiving side, determining status information on data units of the sequence, the status information indicating, for each data unit, whether said data unit has been received or not on the data unit receiving side; and
  transmitting, from the data unit receiving side to the data unit transmitting side of the wireless communication link, a status report containing a pointer designating a first non-received data unit in the sequence and a bitmap providing the status information for a set of data units following said first non-received data unit in the sequence.

In contrast with a last in sequence received data unit, the first non-received data unit can always be identified and the status report can thus always be built.

Besides, as the first non-received data unit is designated by said pointer of the status report, the receiver of the status report knows directly that it has not been received. There is no need to indicate it in the bitmap. So a bit of the bitmap is saved, which makes the status report one bit smaller. Alternatively, the size of the status report may be maintained and the additional bit may bear additional information, such as status information for an additional data unit.

Advantageously, the method further comprises receiving at least one data unit of said set of data units from the data unit transmitting side, wherein the at least one data unit of said set of data units has not been received on the data unit receiving side.

Advantageously, the method further comprises selectively retransmitting data units of said set of data units along the wireless communication link depending on the bitmap contained in the status report.

The above mentioned status report format can be used in downlink and/or in uplink. It may also be used in a status message transmitted between a source node and a target node.

The status report may be transmitted between the wireless device and a target base station after a handover of the wireless communication link with the wireless device has been initiated from a source base station to a target base station. However, it may also be transmitted between the wireless device and a base station of the network, while no handover of the wireless communication link occurs.

Another aspect of the invention relates to a system comprising means for carrying out the above mentioned method.

Still another aspect of the invention relates to a communication device arranged for configuring a status report, the communication device comprising:
  a configuring unit for configuring a PDCP (Packet Data Convergence Protocol) status report including an indicator indicating a sequence number of a first non-received data unit and a bitmap indicating whether or not at least one data unit following said first non-received data unit has been received, after a handover has occurred; and
  a transmission unit for transferring the configured PDCP status report to a lower layer.

Still another aspect of the invention relates to a communication wireless communication method for configuring a status report, the method comprising:

receiving an indication that a handover has occurred from an upper layer;

configuring a PDCP (Packet Data Convergence Protocol) status report including an indicator indicating a sequence number of a first non-received data unit and a bitmap indicating whether or not at least one data unit following said first non-received data unit has been received; and transferring the configured PDCP status report to a lower layer.

Advantageously, the method further comprises transmitting the configured PDCP status report to a network.

Advantageously, the at least one data unit following said first non-received data unit is below the last received out-of-sequence data unit.

Still another aspect of the invention relates to a wireless device arranged for receiving a sequence of data transmitted from a network having a plurality of base stations. The wireless device comprises:

a storage unit for storing status information on data units of the sequence, the status information indicating, for each data unit, whether said data unit has been received or not by the wireless device; and a transmission unit for transmitting to the network, a status report containing a pointer designating a first non-received data unit in the sequence and a bitmap providing the status information for a set of data units following said first non-received data unit in the sequence.

Still another aspect of the invention relates to a network having a plurality of base stations, arranged for receiving a sequence of data transmitted from a wireless device. The network comprises:

a storage unit for storing status information on data units of the sequence, the status information indicating, for each data unit, whether said data unit has been received or not by the network; and a transmission unit for transmitting to the wireless device, a status report containing a pointer designating a first non-received data unit in the sequence and a bitmap providing the status information for a set of data units following said first non-received data unit in the sequence.

Still another aspect of the invention proposes a wireless communication method for transmitting a sequence of data units along a wireless communication link between a wireless device and a network having a plurality of base stations, the wireless communication link having a data unit transmitting side and a data unit receiving side.

The method comprises:

on the data unit receiving side, storing status information on data units of the sequence, the status information indicating, for each data unit, whether said data unit has been received or not on the data unit receiving side;

transmitting, from the data unit receiving side to the data unit transmitting side of the wireless communication link, a status report containing a pointer designating a first non-received data unit in the sequence and a bitmap providing the status information for a set of data units following said first non-received data unit in the sequence; and selectively retransmitting data units of said set of data units along the wireless communication link depending on the bitmap contained in the status report.

BRIEF DESCRIPTION THE DRAWINGS

Other objects, features and advantages of the invention will become apparent when reading the following description on non-limiting exemplary embodiments with reference to the accompanying drawings.

DESCRIPTION OF PREFERRED EMBODIMENTS

Like in the introduction, the invention will now be more particularly described in its application to the PDCP layer of a LTE or E-UMTS network. However, the invention would also apply to data units of other protocol layers and/or to other types of networks (e.g. UMTS), as will appear to one skilled in the art. In this case, the appropriate wireless device, base stations, data units, etc. will replace the UE, eNodeBs, PDCP SDUs, etc. mentioned in the context of LTE.

Figure 7:
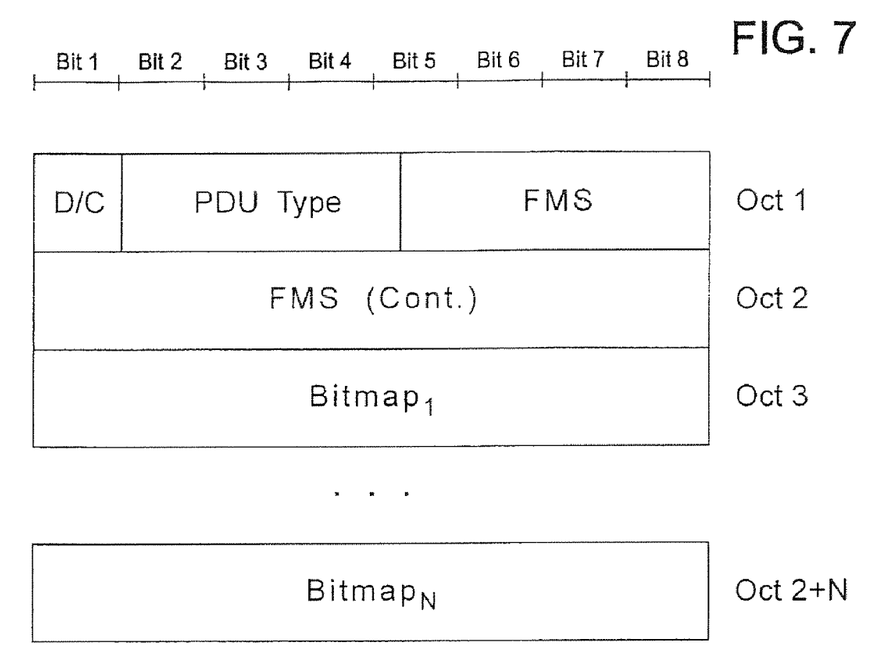
FIG. 7 shows a non limiting example of format for a status report for either downlink or uplink direction according to the invention.

The mechanisms described above can still apply. However, according to the invention, the format of the PDCP status report is modified as shown in FIG. 7.

Instead of the above mentioned LIS field, the PDCP status report includes a pointer designating the first non-received PDCP SDU in the sequence. In the example shown in FIG. 7, this pointer takes the form of a field containing the sequence number SN of the first non-received PDCP SDU. In the following, this field is called FMS for First Missing PDCP Sequence number. The FMS value can be seen as the value that the LIS field would contain if it was used, plus one.

The FMS field is advantageously of the same size as the LIS field, i.e. 12 bits, although other sizes may be suitable as well.

In the non limiting example of FIG. 6, the FMS would contain the SN value 0. As a result, even when there is no in sequence received PDCP SDU, an FMS value can always be determined and a status report can always be built.

It will be noted that when a last in sequence PDCP SDU can be identified, it is always followed immediately by the first non-received PDCP SDU. This resulted in having the first bit in the bitmap always set to 0 in the prior art PDCP status report as shown in FIG. 5. Such first bit did not provide any additional information in addition to the LIS field.

With the PDCP status report as shown in FIG. 7, there is no need to have a bit relating to the first non-received PDCP SDU in the bitmap, as it is implicit from the presence in the FMS field of the sequence number of the first non-received PDCP SDU, that this PDCP SDU has not been received.

Thus the size of the bitmap compared to the case where the LIS is reported would be one bit smaller.

The bitmap can thus be built such that the MSB (Most Significant Bit) of its first octet (Oct 3 in FIG. 7) indicates whether or not the PDCP PDU with the SN (FMS+1) modulo 4096 has been received and, optionally whether or not the corresponding PDCP PDU (Protocol Data Unit) has been decompressed correctly, while the LSB (Least Significant Bit) of the its first octet (Oct 3 in FIG. 7) indicates whether or not the PDCP PDU with the SN (FMS+8) modulo 4096 has been received correctly. The same applies as far as the $N^{th}$ octet of the bitmap (Oct 2+N in FIG. 7), such that the bitmap can cover every PDCP SDU from the PDCP SDU following immediately the first non-received PDCP SDU to the last received PDCP SDU.

The UE fills the bitmap indicating what SDUs are missing (unset bit –'0'), i.e. whether an SDU has not been received or optionally has been received but has not been decompressed correctly, and what SDUs do not need retransmission (set bit –'1'), i.e. whether an SDU has been received correctly and may or may not have been decompressed correctly.

This is illustrated in the table below.

| Bit | Description |
| --- | --- |
| 0 | PDCP PDU with PDCP Sequence Number = (FMS + bit position) modulo 4096 is missing in the receiver. |
| 1 | PDCP PDU with PDCP Sequence Number = (FMS + bit position) modulo 4096 does not need to be retransmitted. |

More generally, the bitmap contained in the status report provides the status information for a set of PDCP SDUs following the first non-received PDCP SDU in the sequence.

This set of PDCP SDUs may start one PDCP SDU after the first non-received PDCP SDU, like in the example described above. But a larger distance between the first PDCP SDU of the set and the first non-received PDCP SDU in the sequence may be used alternatively.

Likewise, the set of PDCP SDUs the status of which is reported in the bitmap can consist of consecutive PDCP SDUs of the sequence, i.e. PDCP SDUs having consecutive sequence numbers higher than the FMS value. However, other possibilities may be suitable as well (e.g. only odd SNs, only even SNs, specific series of SNs, etc.).

Advantageously, at least one PDCP SDU following the first non-received PDCP SDU may be below the last received out-of-sequence PDCP SDU.

If the set of PDCP SDUs includes only a limited number of PDCP SDUs of the sequence following the first non-received PDCP SDU, the saved bit of the bitmap compared to the prior art may be used for providing the status information for an additional PDCP SDU, or any other additional information.

When the PDCP status report is sent from the UE to the target eNodeB as shown in FIG. 3, the target eNodeB can then analyze it to get the SN of the first non-received PDCP SDU from the FMS field and to check from the bitmap whether the following PDCP SDUs have been received or not.

In this way, selective retransmission can be performed by the target eNodeB depending on the bitmap contained in the PDCP status report. Indeed, the target eNodeB may discard at least some of the received PDCP SDUs, and retransmit to the UE at least some of the PDCP SDUs that are not received by the UE and optionally at least some of the PDCP PDUs for which decompression has failed in the UE.

Although there is no bit relating to the first non-received PDCP SDU in the bitmap of the PDCP status report, the target eNodeB can retransmit the first non-received PDCP SDU as it knows from the FMS field that this PDCP SDU has not been received.

Similarly, when the PDCP status report is sent from the target eNodeB to the UE as shown in FIG. 4, the UE can then analyze it to get the SN of the first non-received PDCP SDU from the FMS field and to check from the bitmap whether the following PDCP SDUs have been received or not.

In this way, selective retransmission can be performed by the UE depending on the bitmap contained in the PDCP status report. Indeed, the UE may discard at least some of the received PDCP SDUs, and retransmit to the target eNodeB at least some of the PDCP SDUs that have not been received by the eNodeB and optionally at least some of the PDCP PDUs for which decompression has failed in the eNodeB.

Although there is no bit relating to the first non-received PDCP SDU in the bitmap of the PDCP status report, the UE can retransmit the first non-received PDCP SDU as it knows from the FMS field that this PDCP SDU has not been received.

In this case, the target eNodeB has been informed previously by the source eNodeB, in the SN status transfer message (reference 5' in FIG. 4), of the first non-received PDCP SDU and of whether the PDCP SDUs following said first non-received PDCP SDU have been received or not. This information can advantageously use the same type of format as the PDCP status report shown in FIG. 7.

The present invention has been described above in the case where a PDCP status report is transmitted between a UE and a target eNodeB, after a handover of the wireless communication link with the UE from a source eNodeB to a target eNodeB has been initiated. For example, in the downlink case, the UE may configure the PDCP status report after having received an indication that a handover has occurred from an upper layer.

However, transmitting such status report and possibly performing selective retransmission based on the status report according to the invention may also apply to a wireless communication link between a UE and an eNodeB, while no handover of the wireless communication link occurs. As a non limiting example, a PDCP status report may be transmitted along the wireless communication link when there are some reasons to think that up to date RLC status information were not or will not be received on the data unit transmitting side of the wireless communication link.

What is claimed is:

1. A wireless communication method for transmitting a status report for a sequence of data transmitted via a wireless communication link between a wireless device and a network having a plurality of base stations, the wireless communication link having a data unit transmitting side and a data unit receiving side, the method comprising:

determining, at a Packet Data Convergence Protocol (PDCP) layer located above a Radio Link Control (RLC) layer in the data unit receiving side, status information on data units of the sequence, the status information indicating whether or not a data unit of the data units has been received at the data unit receiving side for each of the data units;

constructing a PDCP status report, in accordance with determined status information for data units of the sequence, from the PDCP layer in the data unit receiving side, wherein the PDCP status report is used by a peer PDCP layer of the data unit transmitting side and contains a pointer designating a sequence number of a first non-received data unit in the sequence and a bitmap providing the determined status information for a set of data units immediately following the first non-received data unit in the sequence, such that the sequence number of the first non-received data unit can always be determined even when there is no in sequence received data unit; and transmitting the PDCP status report from the data unit receiving side to the data unit transmitting side.

2. The method as claimed in claim 1, further comprising receiving at least one data unit of the set of data units from the data unit transmitting side, wherein the at least one data unit has not been received at the data unit receiving side.

3. The method as claimed in claim 1, wherein transmitting the status report from the data unit receiving side to the data unit transmitting side is performed after a handover has occurred.

4. The method as claimed in claim 3,
wherein the wireless device is on the data unit receiving side and the network is on the data unit transmitting side of the wireless communication link,
wherein at least some of the data units of the sequence are forwarded from a source base station to a target base station,
wherein the status report is transmitted from the wireless device to the target base station, and
wherein data units of the set of data units are selectively retransmitted from the target base station to the wireless device.

5. The method as claimed in claim 3,
wherein the wireless device is on the data unit transmitting side and the network is on the data unit receiving side of the wireless communication link,
wherein the status information is sent from a source base station to a target base station,
wherein the status report is transmitted from the target base station to the wireless device, and
wherein data units of the set of data units are selectively retransmitted from the wireless device to the target base station.

6. The method as claimed in claim 1, wherein the set of data units starts one data unit after the first non-received data unit.

7. The method as claimed in claim 1, wherein the set of data units consists of consecutive data units of the sequence.

8. The method as claimed in claim 1, wherein the first non-received data unit designated by the pointer is retransmitted via the wireless communication link.

9. The method as claimed in claim 1, wherein the status information further indicates whether or not a data unit of the data units has been correctly decompressed for each of the data units that have been received.

10. The method as claimed in claim 1, wherein the data units of the sequence are data units of the PDCP layer,
wherein the pointer is a First Missing Sequence number (FMS) field that contains a sequence number of the first non-received data unit, and
wherein a Most Significant Bit of a first octet of the bitmap indicates whether or not a data unit with a sequence number of 'FMS+1' has been received, and a Least Significant Bit of the first octet of the bitmap indicates whether or not a data unit with a sequence number of 'FMS+8' has been correctly received,
wherein each bit of the bitmap is set as either '0' to indicate a data unit that is missing or '1' to indicate a data unit that does not need retransmission.

11. The method as claimed in claim 1, wherein the network is an Evolved Universal Mobile Telecommunication System (E-UMTS).

12. The method as claimed in claim 1, further comprising:
retransmitting, via the wireless communication link, data units of the set of data units which have not been received at the data unit receiving side of the wireless communication link according to the bitmap; and
discarding, at the data unit transmitting side of the wireless communication link, data units of the set of data units which have been received at the data unit receiving side of the wireless communication link according to the bitmap.

13. A communication device arranged for configuring a status report, the communication device comprising:
a configuring unit for constructing a Packet Data Convergence Protocol (PDCP) status report in a PDCP layer located above a Radio Link Control (RLC) layer in the communication device, in accordance with determined status information for data units of a sequence, the PDCP status report used by a peer PDCP layer of a data unit transmitting side and including an indicator that indicates a sequence number of a first non-received data unit and a bitmap indicating the determined status information comprising whether or not at least one data unit immediately following the first non-received data unit has been received, such that the sequence number of the first non-received data unit can always be determined even when there is no in sequence received data unit; and
a transmission unit for transferring the PDCP status report from the communication device to the data unit transmitting side.

14. The device of claim 13, wherein the PDCP status report is transmitted by the transmission unit via a lower layer to a network after a handover has occurred.

15. The device of claim 13, wherein:
the indicator is a First Missing Sequence number (FMS) field that contains a sequence number of the first non-received data unit,
a Most Significant Bit of a first octet of the bitmap indicates whether or not a data unit with a sequence number of 'FMS+1' has been received, and a Least Significant Bit of the first octet indicates whether or not a data unit with a sequence number of 'FMS+8' has been correctly received, and
each bit of the bitmap is set as either '0' to indicate a data unit that is missing or '1' to indicate a data unit that does not need retransmission.

16. A wireless communication method for configuring a status report, the method comprising:
receiving, by a Packet Data Convergence Protocol (PDCP) layer of a mobile terminal, an indication from an upper layer that status reporting is necessary;
constructing, by the PDCP layer located above a Radio Link Control (RLC) layer in the mobile terminal, a PDCP status report, in accordance with determined status information for data units of a sequence, the PDCP status report used by a peer PDCP layer of a data unit transmitting side, the PDCP status report including an indicator that indicates a sequence number of a first non-received data unit and a bitmap indicating the determined status information comprising whether or not at least one data unit immediately following the first non-received data unit has been received, such that the sequence number of the first non-received data unit can always be determined even when there is no in sequence received data unit; and transferring, by the PDCP layer, the PDCP status report from the mobile terminal to the data unit transmitting side.

17. The method of claim 16, further comprising transmitting, by the PDCP layer, the PDCP status report to a network.

18. The method of claim 16, wherein the at least one data unit is below a last received out-of-sequence data unit.

19. The method of claim 16, wherein the PDCP status report is transmitted via a lower layer to a network after handover has occurred.

20. The method of claim 16, wherein:
the indicator is a First Missing Sequence number (FMS) field that contains a sequence number of the first non-received data unit,
a Most Significant Bit of a first octet of the bitmap indicates whether or not a data unit with a sequence number of 'FMS+1' has been received and a Least Significant Bit of the first octet indicates whether or not a data unit with a sequence number of 'FMS+8' has been correctly received, and
each bit of the bitmap is set as either '0' to indicate a data unit that is missing or '1' to indicate a data unit that does not need retransmission.

* * * * *